(No Model.)

A. C. JOHNSON.
Velocipede.

No. 232,825. Patented Oct. 5, 1880.

Witnesses.
J. H. Burridge
T. W. Robertson

Inventor.
A. C. Johnson.
Wm H Burridge.
atty

United States Patent Office.

ALFORD C. JOHNSON, OF MARTIN, OHIO.

VELOCIPEDE.

SPECIFICATION forming part of Letters Patent No. 232,825, dated October 5, 1880.

Application filed July 12, 1880. (No model.)

*To all whom it may concern:*

Be it known that I, ALFORD CHARLES JOHNSON, of Martin, in the county of Ottawa and State of Ohio, have invented a certain new and Improved Velocipede; and I do hereby declare that the following is a full, clear, and complete description of the same, reference being had to the accompanying drawings, making a part thereof.

Figure 1:
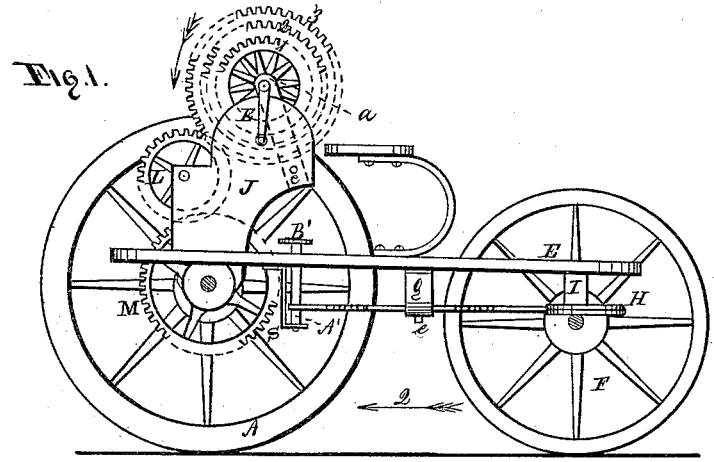
Figure 2:
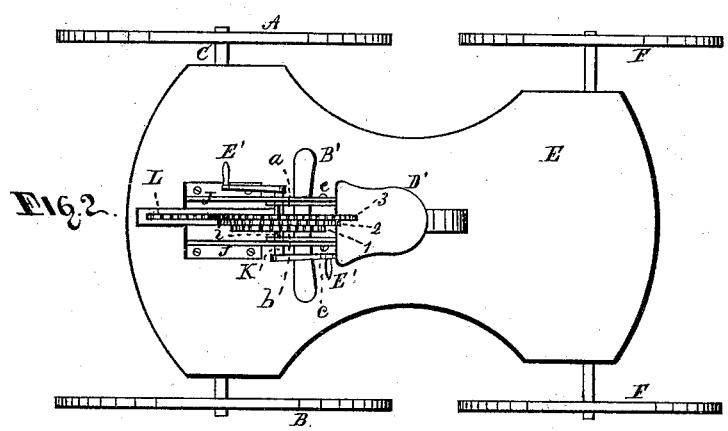
Figure 3:
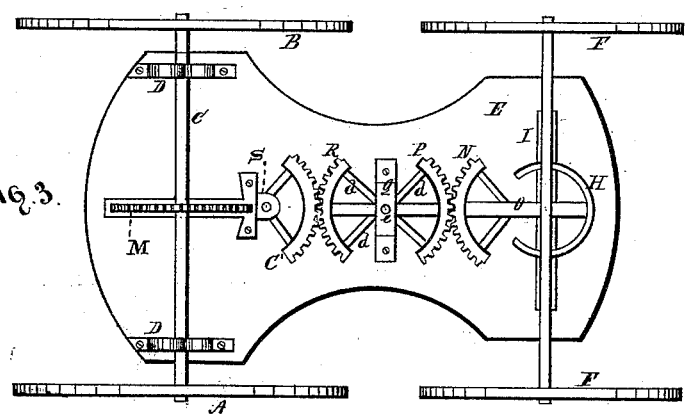

Figure 1 is a side view of the velocipede. Fig. 2 is a plan view. Fig. 3 is a view of the under side.

Like letters of reference refer to like parts in the several views.

The above-said improvement in velocipedes consists in providing the carriage with an arrangement of cog-wheels of different diameters and mounted upon the same shaft or axle, to which they are secured by a feather and caused to revolve therewith for propelling the vehicle. The axle of said differential wheels has its bearings in adjustable arms, whereby the wheels individually may be engaged to a certain other wheel for transmitting motion to the driving-wheels of the carriage, the speed of which being greater or less according to which of the differential wheels is used.

A further improvement relates to certain devices consisting of an association of quadrant-gearing for guiding the vehicle, which is operated by the feet of the rider.

The above-specified improvements in velocipedes are more fully set forth and described, as follows:

The velocipede alluded to is provided with four wheels, of which A and B are the drivers, secured to the axle C, having its bearings in friction-roller journal-boxes D, Fig. 3. In Fig. 1 two of the wheels are represented as removed, in order that the working mechanism on the platform E may be seen.

F are the guiding-wheels. Said wheels F are secured to the axle G, which is made fast to the lower section of a fifth-wheel, H. The upper section of the fifth-wheel is bolted to a bolster, I, on which the end of the platform or floor E of the carriage rests. To said floor is secured standards J, Figs. 1 and 2, between the cheeks of which are journaled the differential cog-wheels 1, 2, and 3, by means of the arms *a* and *b*, in the upper ends of which the shaft K, Fig. 2, of the wheels has its bearings. The lower ends of the arms are respectively pivoted to the sides of the standards at the points *c*.

Hereinafter further reference will be made to said arms and cog-wheels.

Between the cheeks of the standards above alluded to is journaled a cog-wheel, L, arranged to engage the wheel 3, and also the cog-wheel M, mounted upon the axle C, substantially as seen in Fig. 1.

Having described the propelling mechanism of this vehicle, the devices for guiding the same are as follows: To the lower section of the fifth-wheel is attached a quadrant-gear, N, Fig. 3, by means of a reach, O. Said gear is arranged to engage a corresponding gear, P, pivoted in a hanger, Q, depending from the floor of the carriage, as shown in Fig. 1. R is also a quadrant-gear pivoted in the hanger Q. Said segment-gears R and P are united to each other by the arms *d d*, forming a duplex segmental gear; hence the two gears have a common pivotal center of motion at *e*. From the floor depends a hanger, S, in the foot of which is supported an upright shaft, A', Fig. 1. Said shaft projects above the floor of the vehicle, and to the upper end is secured a bar or foot-rest, B', for the feet of the rider. To the lower end of the shaft is keyed a quadrant-gear, C', corresponding with and made to engage the segment-gear R. The arrangement of the quadrant or segmental gearing and their engagement one with the other will be fully understood on referring to Fig. 3.

The manner of operating the above-described velocipede is as follows: The rider takes his place astride the seat D' and places his feet upon the foot-rest B', with a hand upon each of the cranks E'. On turning the cranks in direction of the arrow in Fig. 1 motion is given to the wheel 3, which it imparts to the wheel L. By said wheel L the motion is transmitted to the cog-wheel M, which, in turn, rotates the driving-wheels, thereby propelling the vehicle forward in direction of the arrow 2. The machine at the same time is guided by the feet of the rider by pushing upon the rest B', thereby actuating the segment C' and the wheels F through the intervention of the transmitting duplex segments R and P and the segment N by its attachment to the fifth-wheel and axle.

It will be observed that the largest of the wheels 1 2 3 engages the transfer-wheel L; hence the highest speed will be given to the vehicle by a certain expenditure of power. To vary the speed to lower rates the wheel 3 is disengaged from the wheel L and one of the smaller wheels made to engage the said wheel L. This change is effected by pushing the wheels along on the shaft, so that the wheel 2 or the wheel 1 (as the change of speed may be required) shall be in alignment with the wheel L. The wheel or wheels are then made to engage with the said wheel L by pushing forward the arms *a* and *b* so far as to cause the engagement of the wheels 2 or 1 with the wheel L, in which position the arms are retained by any suitable means, which may consist of a pin, a thumb-screw, or other equivalent device.

As aforesaid, the several wheels are secured to the shaft by a feather, (seen at *i*, Fig. 2;) hence they do not turn upon, but with, the shaft; and on adjusting them laterally thereon for the purpose above specified they can be retained in place by inserting a pin through the hub of one of the wheels and shaft.

From the above it will be obvious that the vehicle can be run swiftly or slowly, and adapted to the strength of the rider, while by the combination of the segmental and duplex gearing it is readily and easily guided.

What I claim as my invention, and desire to secure by Letters Patent, is—

1. In velocipedes, the combination of the differential wheels 1, 2, and 3, feathered to the shaft K, adjustable arms pivoted in the cheeks of the standards and bearing said shaft K and cranks, transmitting-wheel L, cog-wheel M, axle and driving-wheels, all constructed and arranged as described, and for the purpose set forth.

2. In velocipedes, the combination of the wheels 1 2 3, adjustable arms, transmitting-wheel, and cog-wheel M and platform, foot-rest B', shaft A', and segment-gear, in combination with the transmitting duplex segment-gear, segment N, fifth-wheel, axle, and wheels F, all constructed and arranged to operate and co-operate substantially as described, and for the purpose set forth.

In testimony whereof I affix my signature in presence of two witnesses.

ALFORD CHARLES JOHNSON.

Witnesses:
C. H. PRENTISS,
J. H. BURRIDGE.